United States Patent [19]

Okui

[11] 4,282,056

[45] Aug. 4, 1981

[54] BOTH-SURFACE ADHESIVE TAPE PRODUCING APPARATUS

[76] Inventor: Tokujiro Okui, 3, C10-204, 3-chrome, Shinsenri Minamimachi, Toyonaka City, Japan

[21] Appl. No.: 53,931

[22] Filed: Jul. 2, 1979

Related U.S. Application Data

[62] Division of Ser. No. 1,032, Jan. 4, 1979, abandoned.

[51] Int. Cl.$^3$ .............................................. B32B 31/00

[52] U.S. Cl. ...................................... 156/519; 118/37; 156/552; 156/584

[58] Field of Search .................... 118/35, 37; 156/248, 156/249, 297, 299, 264, 265, 542, 552, 584, 519; 427/289

[56] References Cited

U.S. PATENT DOCUMENTS

| | | | |
|---|---|---|---|
| 2,703,083 | 3/1955 | Gross | 156/248 X |
| 3,052,586 | 9/1962 | Brown | 156/264 X |
| 3,519,514 | 7/1970 | Ignell | 156/299 X |
| 3,536,033 | 10/1970 | Lockwood | 118/37 |
| 3,574,026 | 4/1971 | Kucheck | 156/248 X |
| 3,799,829 | 3/1974 | Heatwole | 156/249 |

*Primary Examiner*—Bernard D. Pianalto
*Attorney, Agent, or Firm*—Millard & Cox

[57] ABSTRACT

A rolled strip of adhesive mounted on a reel is unrolled and punched with a cutter pressed against it or by passing between a punching roll and a receiving roll, the punched part being affixed to a band-shaped film of paper or plastic. The film having had a part of the punched adhesive pasted on it is wound up on a winding reel and the punched excess adhesive is wound up on another winding reel.

15 Claims, 12 Drawing Figures

BOTH-SURFACE ADHESIVE TAPE PRODUCING APPARATUS

This is a division of the application Ser. No. 001,032, filed Jan. 4, 1979, now abandoned.

BACKGROUND OF THE INVENTION

1. Field of the Invention

This invention relates to a both-surface adhesive tape made by pasting at intervals both-surface adhesive pieces of any shape and size on one surface of a peeling band-shaped base sheet (which shall be merely called a peeling sheet) made of paper or plastics and an apparatus for producing the same.

2. Description of the Prior Art

As is well known, existing both-surface adhesive tape generally has a both-surface adhesive pasted on one entire surface of a peeling sheet and is used by being pasted, with the peeling sheet up, and then peeling the peeling off the both-surface adhesive. Besides the tape-shaped adhesive, there are units made in such various shapes and sizes as, for example, of circular and square ones from the first. In this kind of adhesive unit, peeling sheets are pasted respectively on both surfaces of the adhesive and, in the case of using it, one peeling sheet is first peeled off, the adhesive is pasted and then the peeling sheet on the upper side is peeled off.

However, in such existing one, as there is no peeling space, the peeling sheet is difficult to peel. Particularly, in the case of a unit in which peeling sheets are pasted respectively on both surfaces, though one peeling sheet can be comparatively easily peeled off before the unit is pasted, the other peeling sheet has been very difficult and inconvenient to peel off after the unit is pasted.

SUMMARY OF THE INVENTION

A primary object of the present invention is to provide a both-surface adhesive tape having had the above mentioned defects eliminated and which is very easy to use.

Another object of the present invention is to provide an apparatus for automatically producing the above mentioned both-surface adhesive tape.

In the both-surface adhesive tape of the present invention, the both-surface adhesive is applied on one surface of a peeling sheet which adhesive may be of any shape and size and applied at regular intervals along the peeling sheet. The excess portion of the strip of adhesive from which the shaped adhesive is punched is, in turn, separated from the shaped portions. A tape-shaped separator of a proper width is interposed between said both-surface adhesive and peeling sheet. In the case of this both-surface adhesive tape, there are advantages that, because the both-surface adhesive pieces pasted on one surface of the peeling sheet are pasted at intervals and of a certain shape and size on one surface of the peeling sheet, the bothsurface adhesive can be pasted on a substrate without cutting the tape and, as the peeling sheet itself on which the both-surface adhesive is pasted becomes a peeling space, the peeling work can be simple and quick.

On the other hand, the tape shaped separator of a proper width is interposed between the both-surface adhesive and the peeling sheet, because of the likelihood of the bothsurface adhesive completely adhering to the peeling sheet in which case said tape is substantially impossible. This tape-shaped separator is wound up together and held between the both-surface adhesive and peeling sheet before making the punching operation or prior to winding up the product on the reel.

DETAILED DESCRIPTION OF PREFERRED EMBODIMENTS

Figures 1A, 1B, 1C, 1D:
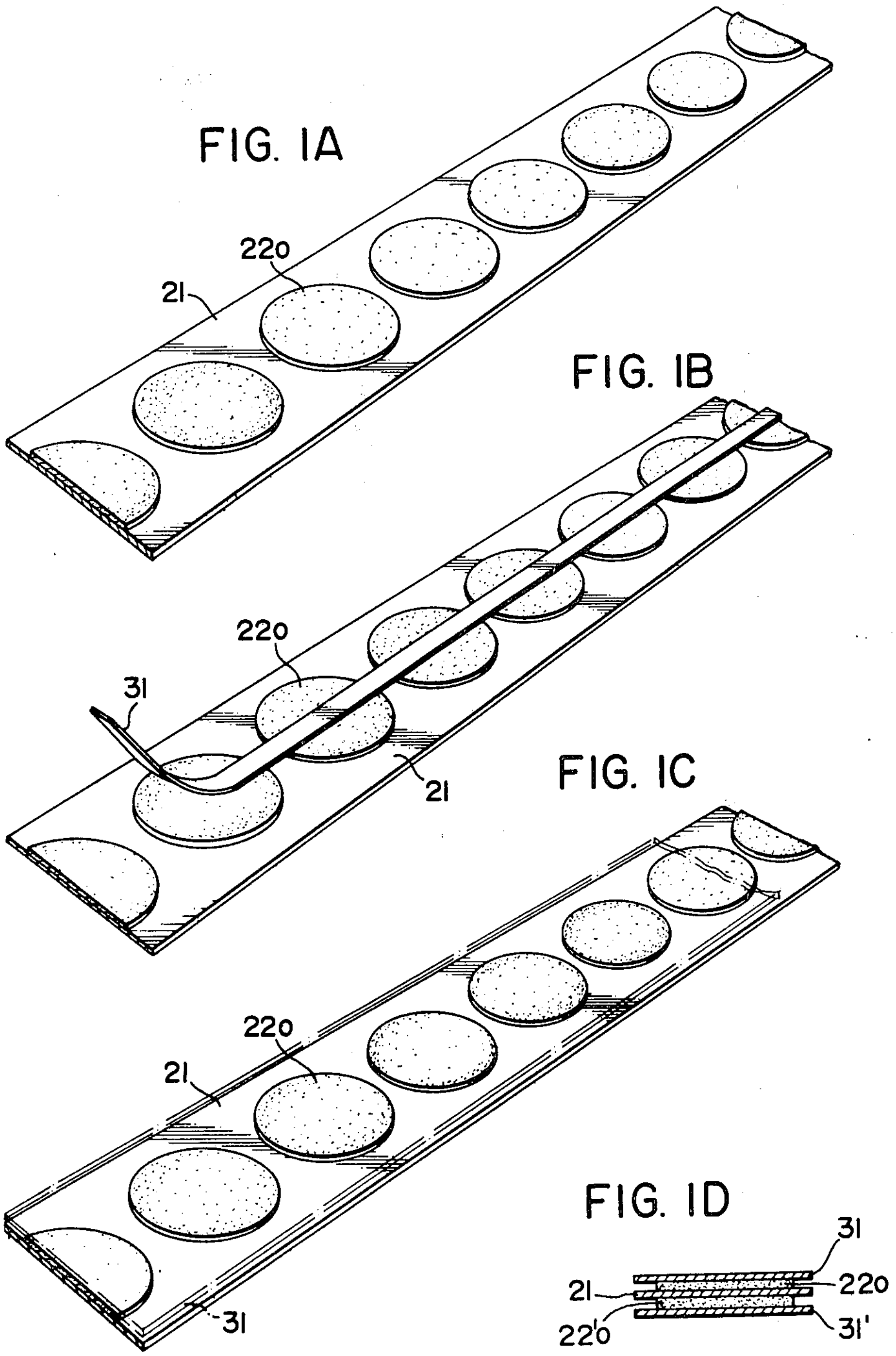
FIGS. 1A to 1C are perspective views of respective both-surface adhesive tapes embodying the present invention.
FIG. 1D is a vertically sectioned view of a bothsurface adhesive tape of another embodiment.

An embodiment of the both-surface adhesive tape producing apparatus includes (1) a punching mechanism for punching a both-surface adhesive pasted on the entire one surface of a peeling sheet, the punched area to be of any shape and size, (2) a tape feeding mechanism for moving the tape at set intervals and (3) operatively connected with this punching operation, an excess both-surface adhesive peeling mechanism for peeling the excess portion of the both-surface adhesive off the peeling sheet after the punching. The respective mechanisms of this embodiment shall be explained in the following with reference to FIGS. 2 to 4. First of all, in the both-surface adhesive punching mechanism, a cutter fitting base 4 is horizontally supported with an air cylinder 3 fixed to a vertical supporting pillar part 2 of a machine base 1, an always upward tension is given to two return springs 5 provided on both sides of the air cylinder. A punching cutter 7 (shown to be circular in this embodiment) is fitted to a chuck 6 provided to project in the middle of the lower surface and a punching receiver plate 8 positioned below this cutter so as to receive a both-surface tape 20 is provided on the machine base.

The fixed stroke cutter fitting base 4 is lowered by the air cylinder 3, the adhesive 32 of the both-surface adhesive tape 20 is punched with the cutter 7 on the punching receiving plate 8, the cutter fitting base 4 rises to the original position under the action of the return spring 5 simultaneously with the punching and such operation is to be automatically repeated. Here, the both-surface adhesive tape 20 has the both-surface adhesive 22 pasted on the entire one surface of the peeling sheet 21, only the both-surface adhesive 22 is punched (incised) and finally the excess portion of the adhesive is peeled off so that circular both-surface adhesive pieces $22_O$ may remain on the upper surface of the sheet 21. The shape of cutter 7 is optional.

The feeding mechanism comprises tape unwinding pinch roll 9 and tape winding pinch rolls 10 provided respectively in both end parts of the above mentioned cutter fitting base 4 which draw the tape from reel 11 past the punch 7 and wind the resulting materials on reels 12 and 17. Both pinch rolls are rotated and driven by utilizing the returning air of the punching air cylinder 3. Such mechanism is of a known technique and therefore shall not be explained here. The tape unwinding and winding reels 11 and 12 are rotated and driven respectively through pulleys $13_1$ to $13_4$ and belts $15_1$ and $15_2$. That is to say, at the same time as the punching cutter 7 lowers and rises, the pinch rolls 9 and 10 will rotate by a preset amount to intermittently feed the both-surface adhesive tape. Reels 11 and 12 are also forcibly rotated because, the tape itself is bonded with the adhesive and with only the torque of the pinch rolls, the unwinding and winding will be more difficult. In the drawing, numeral 16 is a guide roller.

Figure 3:
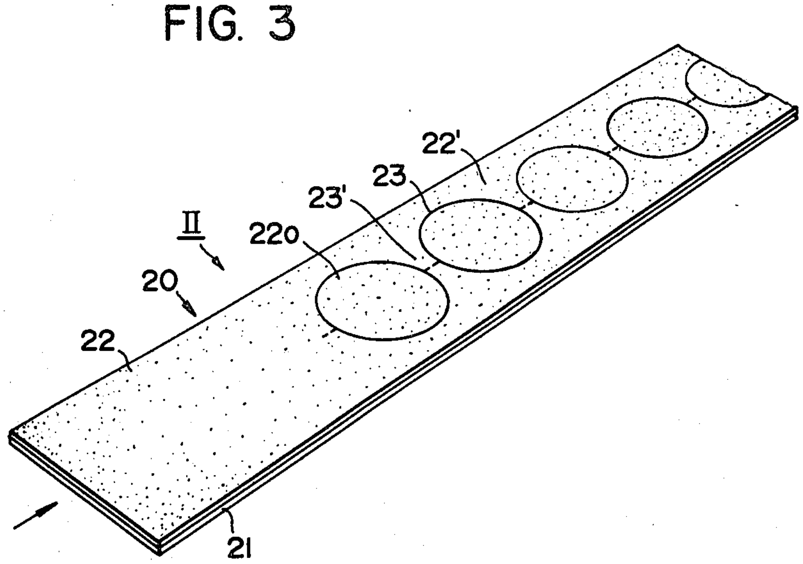
FIG. 3 is a magnified perspective view of a part II in FIG. 2.

In the peeling mechanism for peeling the excess both-surface adhesive off the peeling sheet after punching the bothsurface adhesive, an excess both-surface adhesive winding reel 17 provided on the cutter fitting base 4 adjacent the both-surface adhesive tape winding reel 12 is rotated and driven through pulleys $18_1$ and $18_2$ and a belt 19 with the winding pinch rolls 10 the same as the tape winding reel 12. That is to say, it is to be rotated the same simultaneously with the both-surface adhesive tape winding reel 12 after the punching to wind the excess both-surface adhesive 22' on said reel 17. In order that the excess both-surface adhesive 22' may be effectively peeled off, as shown in FIG. 3, an incision 23' can be made between the punched circular both-surface adhesive pieces $22_0$. Such incision can be made simultaneously with the punching by providing a blade corresponding to the distance to project on the said surface of the cutter 7.

Now, the production of a both-surface adhesive tape having circular both-surface adhesive pieces with the apparatus of the above mentioned embodiment shall be explained. First of all, the both-surface adhesive tape 20 made by pasting the both-surface adhesive 22 on the entire one surface of the peeling sheet 21 is set on the both-surface adhesive unwinding reel 11. In this state, the tape is partly unwound, is passed through the unwinding rolls 9, is further passed between the cutter 7 and receiving plate 8, through the guide roller 16 on this side and is then passed to the winding pinch rolls 10, the peeling sheet 21 and the both-surface adhesive 22 are separated from each other in this position, the peeling sheet 21 is wound up on the tape winding reel 12 and the both-surface adhesive 22 is wound up on the corresponding winding reel 17. When this operation ends, the operating button of the air cylinder 3 is switched on. Simultaneously with the switching on, the air cylinder 3 will lower by a fixed stroke and the both-surface adhesive 22 will be punched with the cutter 7. Simultaneously with the rise of the cutter, with the rotation of both pinch rolls 9 and 10 and both reels 11 and 12, the both-surface adhesive tape 20 will move for a fixed length rightward in FIG. 2 and will stop and the next punching operation will be made. This operation is then continuously repeated to make circular incisions 23 at regular intervals on the both-surface adhesive 22. When the thus punched both-surface adhesive tape comes out of the winding pinch rolls 10, the circularly punched parts $22_0$ will be separated from the other part 22', the both-surface adhesive tape 20 with circular both-surface adhesive pieces remaining at regular intervals on the peeling sheet 21 will be wound up on the corresponding winding reel 12 and the other excess adhesive 22' will be wound up on the corresponding winding roll 17.

FIG. 1A shows a both-surface adhesive tape embodying the present invention as developed. The circular both-surface adhesive pieces $22_0$ punched with the cutter 7 are pasted at regular intervals on the peeling sheet 21. In the case of using this both-surface adhesive pieces $22_0$, if, as mentioned above, the rolled both-surface adhesive tape is payed out, has the both-surface adhesive pieces to be used pasted on predetermined parts and is pulled and moved as held in the winding direction, the both-surface adhesive pieces will be simply peeled off. That is to say, in the case of the both-surface adhesive tape embodying the present invention, the peeling sheet can be peeled off while holding the tape without the need of cutting the tape itself.

Figure 5:
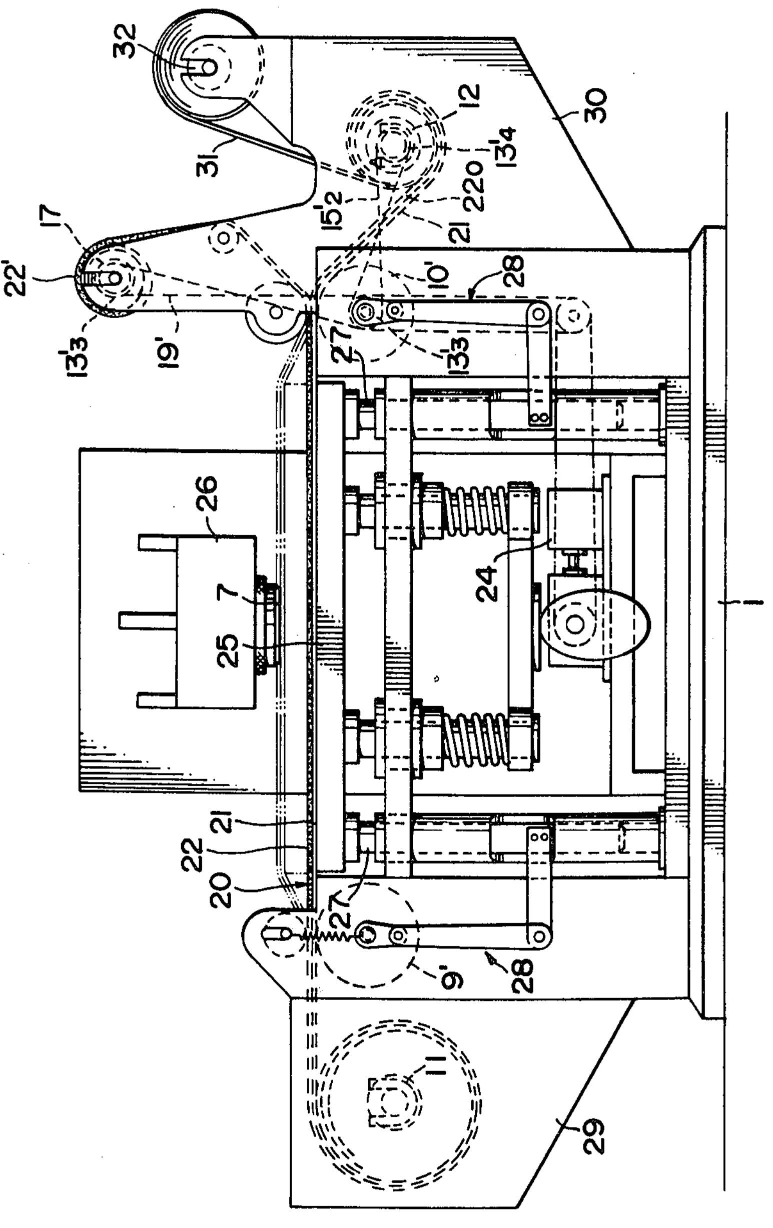
FIG. 5 is an elevation of another embodiment of a both-surface adhesive tape producing apparatus.

Another both-surface producing apparatus embodying the present invention shall be explained in the following with reference to FIGS. 5 and 6.

Figure 2:
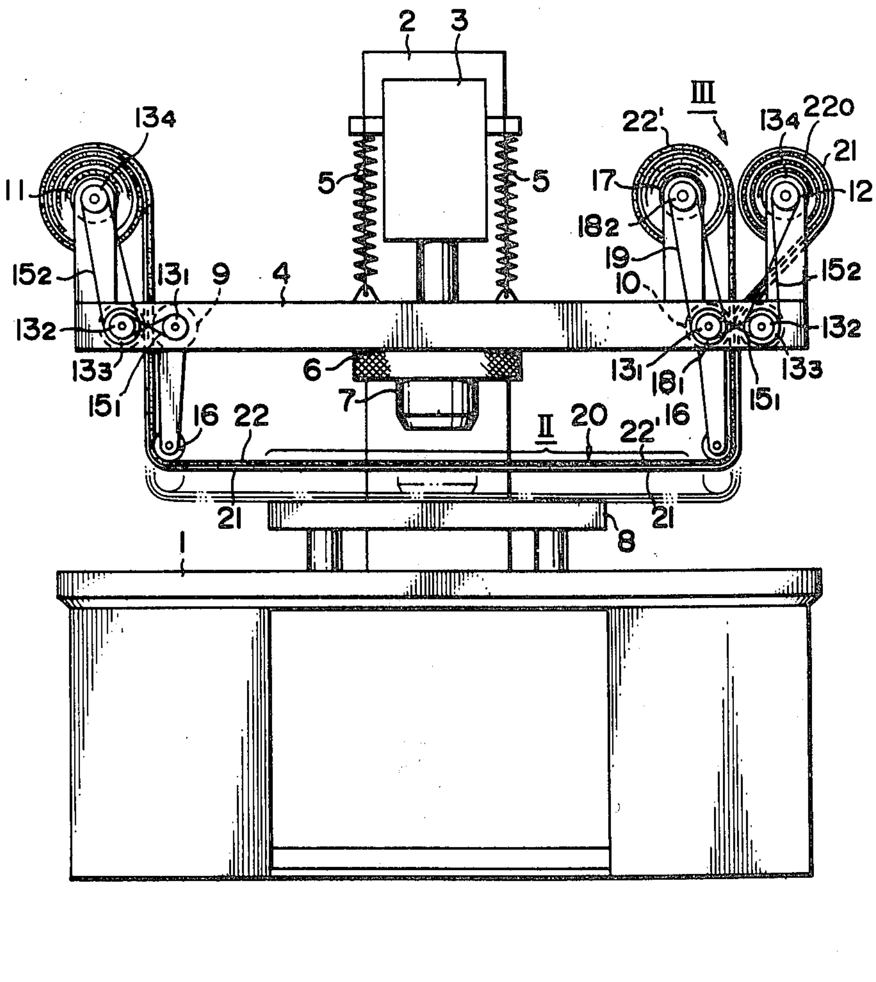
FIG. 2 is an elevation of a both-surface adhesive tape producing apparatus embodying the present invention.
Figure 4:
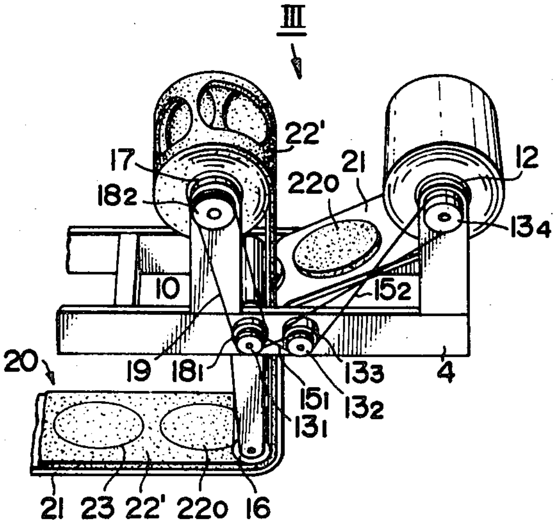
FIG. 4 is a magnified perspective view of a part III in FIG. 2.

As the formation of this embodiment substantially corresponds to that of the embodiment in FIGS. 2 to 4, the same reference numerals shall be attached to the same respective parts.

First of all, in this embodiment, the both-surface adhesive punching mechanism comprises an up and down moving base 25 repeating an up and down motion of a fixed stroke by using, for example, an electric motor 24 as a power source and a cutter fitting base 26 positioned above said up and down moving base and for fitting the cutting 7 for punching the both-surface adhesive 22 of the both-surface adhesive tape 20 moving on said up and down moving base. The up and down moving base 25 is provided horizontally on the machine base 1 through a known up and down motion mechanism (such as, for example, a cam or eccentric wheel mechanism for converting a rotary motion to a linear motion. Two guiding supporting pillars 27 are provided in each of the front and rear. By the way, the up and down moving base 25 may be driven by either of the motor and cylinder. Here, the case of using the motor is exemplified. Further, the cutter 7 fitting base 26 is fixed vertically to the machine base 1 and the punching cutter 7 (which is exemplified to be circular in this embodiment) is fitted, for example, in an inserted type to the central part of the lower surface of the cutter fitting base. In short, in the punching mechanism of this embodiment, when the up and down moving base 25 rises, the both-surface adhesive 22 will be punched (incised). When only the both-surface adhesive is thus punched, if only the both-surface adhesive 22 is peeled off, the punched parts which are circular both-surface adhesive pieces $22_0$ here will remain on the peeling sheet.

By the way, in this embodiment, too, the above mentioned punching cutter 7 can be freely selected in response to the shape to be punched. Further, the cutter fitting means is not limited to be in the inserted type but can be any means such as in a chuck type.

In the both-surface adhesive tape 20 intermittently feeding mechanism in this embodiment, the tape feeding pinch rolls 9' and winding pinch rolls 10' arranged respectively in front and rear of the above mentioned up and down moving base 25 are intermittently rotated by respective crank mechanisms 28 by utilizing the up and down motions of the respective guiding supporting pillars 27 of the up and down moving base. That is to say, the both-surface adhesive tape 20 is fed at a predetermined pitch as operatively connected with the both-surface adhesive punching operation. By the way, the same as in the above described embodiment, numeral 11 is a tape unwinding reel before punching the both-surface adhesive and numeral 12 is a product winding reel after punching the both-surface adhesive. They are born respectively on fitting bases 29 and 30 fixed to the machine base 1. The product winding reel 12 is rotated by the motor 24 through a belt $14_2'$ hung between a pulley $13_3'$ fitted to the tape winding pinch roll 10' supporting shaft and a pulley $13_4'$ fitted to the winding reel supporting shaft. In this case, as the winding diameter of the product winding reel varies, the rotation of said reel must be varied. For this purpose, the product winding reel 12 is to be continuously rotated by the motor 24 and includes a slip clutch. By the way, the driving source in this case is not limited to the up and down moving base driving motor 24 but may be another motor. On the other hand, the tape is fed not only on the winding side but also on the unwinding side, because it is considered that, as the both-surface adhesive tape itself is bonded with said both-surface adhesive, the tape will be hard to feed only on the winding side.

In the mechanism of peeling the excess both-surface adhesive off the peeling sheet after punching the both-surface adhesive, the winding roll 17 is operatively connected with the tape winding reel 10' and is integrally fitted to the machine base 1 so as to be driven by the same driving motor 24 through pulleys and and a belt 19' the same as in the product winding reel 12. Further, the excess both-surface adhesive winding reel 17 is slip-rotatably born so as to be able to correspond to the variation of the winding.

In order that this excess both-surface adhesive may be more effectively peeled off, that is, the punched both-surface adhesive pieces $22_0$ remining on the peeling sheet 21 may not be peeled off together with the excess portion 22', the same as in the above described embodiment, as shown in FIG. 3, an incision 23' of the same depth can be made between the punched both-surface adhesive pieces $22_0$.

Figure 6:
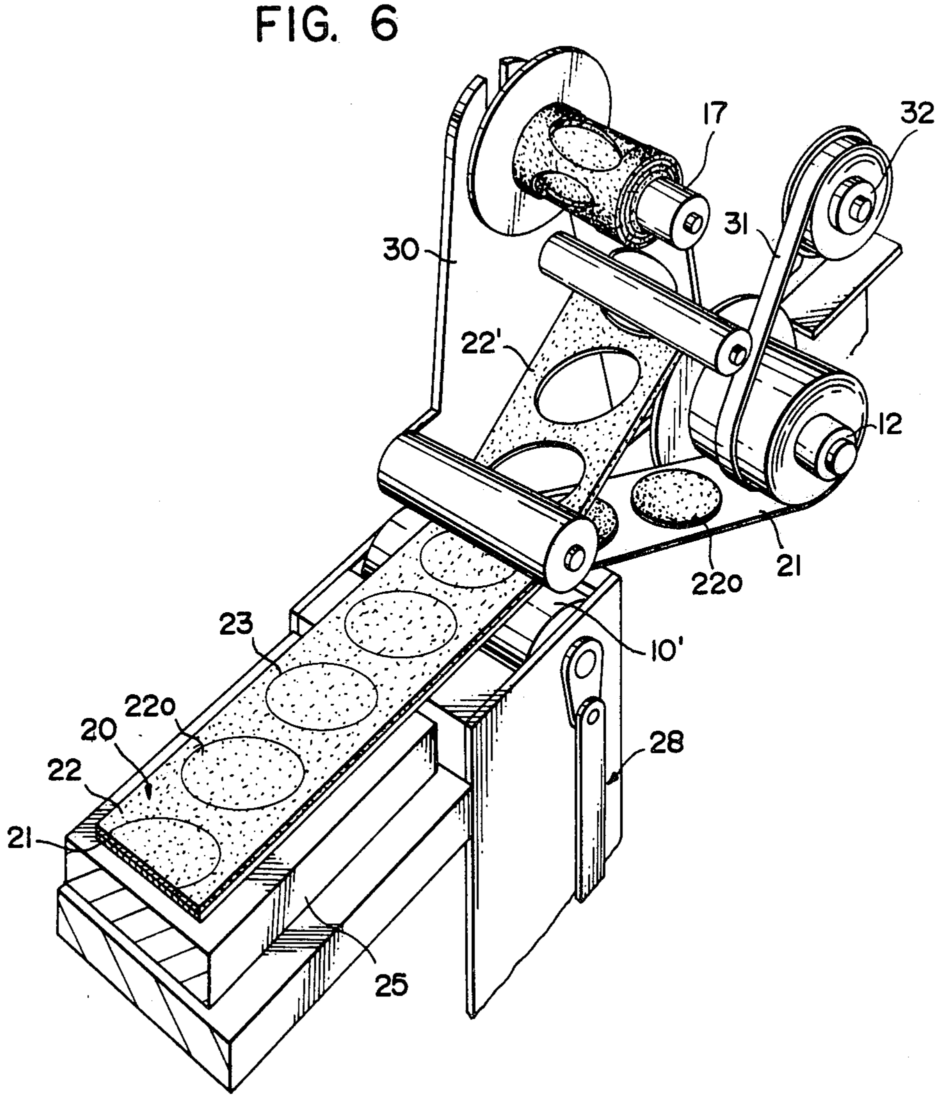
FIG. 6 is a magnified perspective view of parts for respectively winding up the product and excess both-surface adhesive of the embodiment in FIG. 5.

In the method of feeding the band-shaped separator 31 of a proper width between the both-surface adhesive and the peeling sheet 21 in order to prevent them from sticking it each other in the step of winding the product on said reel 12, for example, as shown in FIG. 6, a reel 32 on which the band-shaped separator is wound is rotatably provided above the product winding reel 12 and said separator 31 is held so as to be positioned above the punched both-surface adhesive pieces $22_0$ and can be thereby easily fed.

The operation and effects of the apparatus of this embodiment shall be described in the following. First of all, the both-surface tape 20 made by pasting both-surface adhesive 22 on the entire one surface of the peeling sheet 21 is set on the both-surface adhesive tape unwinding reel 11, is partly unwound in this state is passed through the tape feeding pinch rolls 9' on this side, is further mounted on the upper surface of the up and down moving base 25, is passed below the punching cutter 7 is passed through the tape winding pinch rolls 10' on the winding side. In this position, the peeling sheet 21 and the both-surface adhesive 22' are separated from each other. The peeling sheet 21 is wound on the preset product winding reel 12. The excess both-surface adhesive 22' is wound on the corresponding winding reel 17. Further, in the case of winding the peeling sheet 21 on the product winding reel 12, the band-shaped separator 31 is wound together with said peeling sheet 21.

When the driving motor 24 is then started, the up and down moving base 25 will repeat an up and down motion of a fixed stroke to punch the both-surface adhesive 22 and the both-surface tape 20 will be intermittently fed at a fixed pitch as operatively connected with the punching operation. That is to say, in case the up and down moving base 25 rises, the both-surface adhesive 22 will be punched to be circular by the cutter 7 and, at the same time as the up and down moving base 25 loweres, the two front and rear tape feeding and winding rolls 9' and 10' will be rotated by a fixed angle to feed the both-surface adhesive tape 20 by a fixed pitch and stop it. At the same time, the next punching operation will be made. Thereafter, this operation will be continuously repeated to make circular incisions 23 at regular intervals on the both-surface adhesive 22. Then, as shown as magnified in FIG. 6, the circularly punched both-surface adhesive pieces $22_0$ will be separated from the other so-called excess both-surface adhesive 22', the product having the circular both-surface adhesive pieces $22_0$ remaining at regular intervals on the peeling sheet 21 will be wound up on the corresponding winding reel 12 and the excess both-surface adhesive 22' will be wound up on the corresponding winding reel 17. In such case, the band-shaped separator 31 will be also wound up together on the product winding reel 12.

FIG. 1B shows a part of the product as developed. The circular both-surface adhesive pieces $22_0$ punched with the cutter 7 are pasted at regular intervals on the peeling sheet 21 and further the band-shaped separator 31 for preventing the peeling sheet 21 from sticking is pasted on the both-surface adhesive. In the case of using the both-surface adhesive tape of this embodiment, the rolled both-surface adhesive tape is payed out and the band-shaped separator 31 is first peeled off. As this band-shaped separator 31 is partly bonded, it can be very simply peeled off and therefore needs no trouble. In the case of pasting the both-surface adhesive pieces $22_0$ to be used, the peeling sheet 21 which is a base sheet is held and pressed and is then pulled and moved in the lengthwise direction of the tape to be easily peeled off. If the band-shaped separator is made wider than the both-surface adhesive as in FIG. 1C, the product will be able to be handled as sheet-shaped. That is to say, in the case of the both-surface adhesive tape of this embodiment, the tape itself need not be cut as in the above mentioned embodiment and the peeling sheet 21 becomes a peeling space as it is and can be therefore easily peeled off. Further, there is an advantage that the tape can be worked as held. By the way, after such product as in FIG. 1C is made, when the product is again passed through the apparatus of this embodiment with the back surface of the peeling sheet on which the both-surface adhesive is not bonded made the upper surface, a sheet-shaped product provided with both-surface adhesive pieces $22_0'$ and a separator 31' by sandwiching the peeling sheet 21 as in FIG. 1D will be able to be made.

Figure 7:
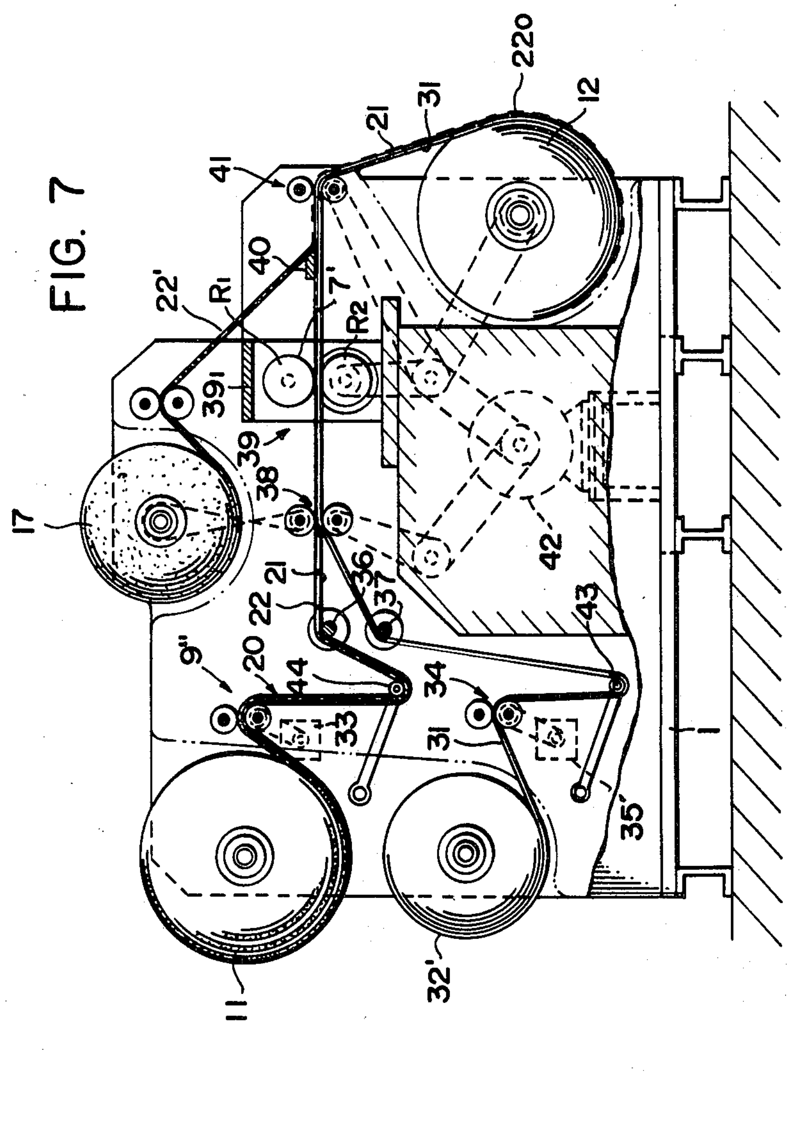
FIG. 7 is an elevation of still another both-surface adhesive tape producing apparatus embodying the present invention.
Figure 8:
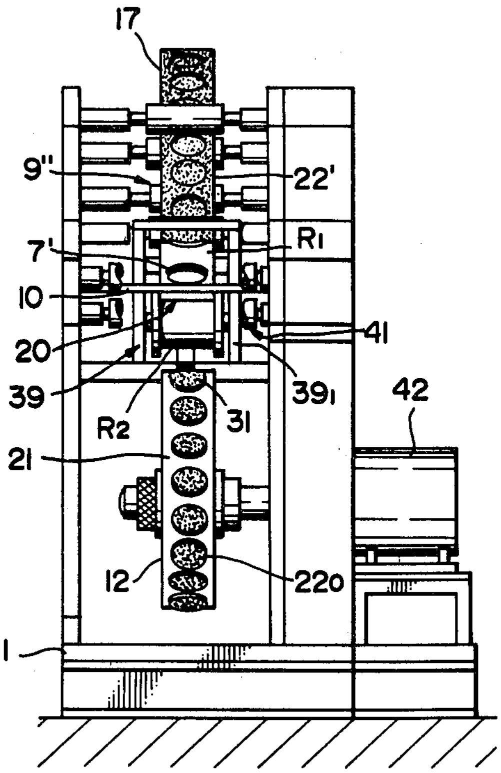
FIG. 8 is a side view of the apparatus in FIG. 7.
Figure 9:
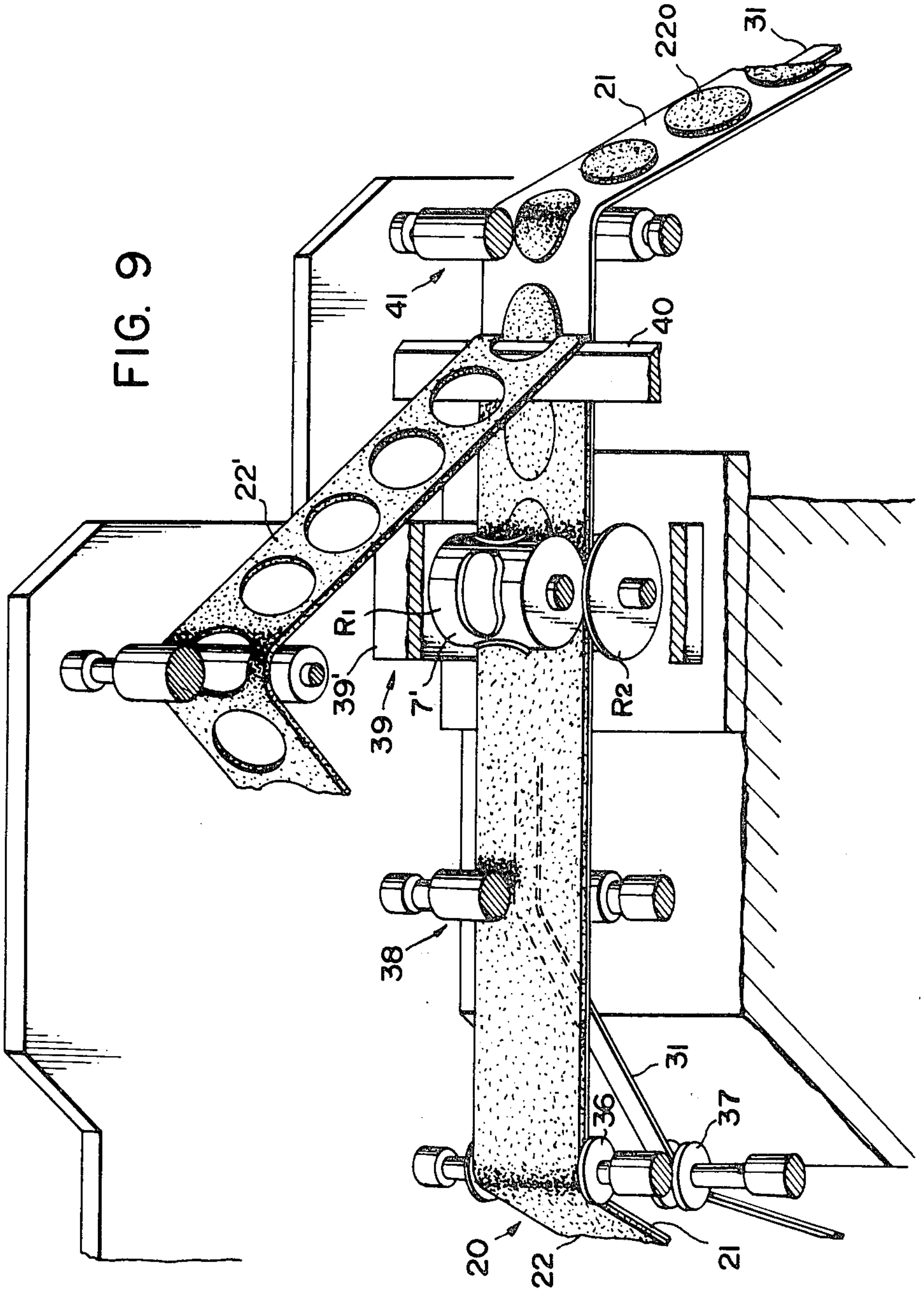
FIG. 9 is a magnified perspective view of an important part of the apparatus in FIG. 7.

Further, another both-surface adhesive tape producing apparatus embodying the present invention shall be detailed with reference to FIGS. 7 to 9. The same reference numerals shall be attached to the same respective parts as in the above described first and second embodiments.

In this embodiment, 1 is a machine base, 11 is a both-surface adhesive tape unwinding reel, 9'' is a both-surface adhesive tape feeding reel, 33 is its driving motor, 32′ is a separator reel, 34 is a separator delivering roll, 35 is its driving motor, 36 and 37 are positioning rolls, 36 and 37 are positioning rolls, 38 is a pressing roll for overlapping the both-surface adhesive tape 20 and separator 31 with each other, 39 is a device for punching the both surface adhesive of the both-surface adhesive tape, 4C is a peeling plate for peeling the both-surface adhesive off the peeling sheet, 17 is a both-surface adhesive winding reel, 12 is a product winding reel and 41 is a product delivering reel. In the above mentioned both-surface adhesive punching device 39, a punching roll $R_1$ and receivng roll $R_2$ are born on a mount $39_1$ fixed to the machine base 1 and the punching roll $R_1$ is to be rotated and driven by a main driving motor 42. The punching roll $R_1$ for punching the both-surface adhesive 22 is provided with punching blades 7′ (exemplified to be circular in this embodiment) to project at regular intervals on the barrel part and can be integrally shaped by machining or can be made by welding the circular blades on the barrel part. The receiving roll $R_2$ to be used is an ordinary flat surface roll or concavoconvex roll. These punching roll $R_1$ and receiving roll $R_2$ are so provided that, when the both-surface adhesive tape 20 passes between them, the both-surface adhesive 22 may be punched (incised) by the punching roll $R_1$. By the way, in the embodiment in FIGS. 7 to 9, there is shown in case that the both-surface adhesive tape 20 is positioned above and the separator 31 is positioned below. However, needless to say, they may be reversed to each other. In such case, naturally the both-surface adhesive of the both-surface adhesive tape is to be punched from below and thereofre the punching roll $R_1$ and receiving roll $R_2$ are reversed respectively to the illustrated vertical positions.

If only the both-surface adhesive 22 is punched with the above mentioned punching device, when only the excess both-surface adhesive 22′ is peeled off, the punched parts which are the circular both-surface adhesive pieces $22_0$ will remain on the peeling sheet 21.

The peeling plate 40 for peeling the excess adhesive 22′ off the peeling sheet 21 after the both-surface adhesive is punched is fixed adjacently to the machine base 1. The excess adhesive 22′ winding reel 17 is also fitted to the machine base 1 so as to be rotated and driven by the main driving motor 42 through pulleys and belts.

The product winding reel 12 is to be rotated by the main driving motor 42 through pulleys and belts. By the way, as the winding diameter of this reel varies, the rotation of said reel must be varied. For this purpose, in the same manner as in the above described second embodiment, said product winding reel 12 includes a slip clutch and the excess both-surface adhesive winding reel 17 includes a slip clutch so as to be able to correspond to the variation of the wind.

The method of feeding the separator 31 to be interposed between the both-surface adhesive and the back surface of the peeling sheet is different from that of the above described second embodiment. For example, as shown in FIG. 7, a separator reel 32′ is rotatably born below the both-surface adhesive tape unwinding reel 11 so that said separator 31 may be unwound by the delivering rolls 34 rotated and driven by the motor 35 so as to be positioned just below the both-surface adhesive tape 20. By the way, in FIGS. 7 to 9, the separator 31 is to be fed on the both-surface adhesive tape 20 feeding side but it is needless to say that, as in the embodiment in FIGS. 5 and 6, it may be fed on the product winding site after the punching device 39.

Further, in this embodiment, too, the tape may be fed not only on the winding side but also on the unwinding side for the above described reason.

The position peeling off the excess both-surface adhesive is not limited to be between the punching device 39 and delivering rolls 41 but the excess both-surface adhesive may be peeled off, for example, as it comes out of the delivering rolls 41 or a roll may be used in place of the peeling plate. Numerals 43 and 44 indicate tension rolls.

The respective mechanisms of this embodiment are set on the same machine base. In this case, their fitting positions and setting distances may be properly determined depending on the size and type of the apparatus.

The operation and effects of the apparatus of this embodiment shall be described in the following. The bothsurface adhesive tape 20 is first partly unwound from said reel, is passed through the delivering rolls 9″, is then passed through the pressing rolls 38 through the positioning roll 36 and is then passed between the punching roll $R_1$ and receiving roll $R_2$ of the punching device. After it is passed below the peeling plate 40, the both-surface adhesive 22 and peeling sheet 21 are separated from each other, the excess both-surface adhesive 22′ is pulled diagnoally upward through the peeling plate and is wound on the winding reel 17 and, on the other hand, the peeling sheet 21 is passed through the delivering rolls 41 and is wound on the product winding reel 12. The separator 31 is passed through said delivering rolls 34, is passed through the pressing rolls 38 through the positioning roll 37, is overlapped with the both-surface adhesive tape 20, is further passed between the punching roll $R_1$ and receiving roll $R_2$ of the punching device 39 the same as the both-surface tape, is passed through the final delivering rolls 41 and is wound up on the product winding reel 12. By the way, in the above, the both-surface adhesive tape 20 and separator 31 are explained to be separately passed. However, usually the both-surface adhesive tape and separator are overlapped with each other from the first, are passed through the respective rolls and are wound up on the product winding reel 12.

After the above mentioned preparatory operation is finished, the driving motors 42, 33 and 35 are simultaneously started. When these motors are started, circular incisions 23 will be made at regular intervals on the both-surface adhesive 22 of the both-surface adhesive tape 20 by the punching roll $R_1$. As shown as magnified in FIG. 9, the thus punched both-surface adhesive tape will be separated into the circularly punched both-surface adhesive pieces $22_0$ and excess both-surface adhesive 22′ and the product having the circular both-surface adhesive pieces $22_0$ remaining at regular intervals on the peeling sheet will be wound up together with the seperator 31 on the corresponding winding reel 12. On the other hand, the excess both-surface adhesive will be wound up on the corresponding reel 17.

As shown in FIG. 1B, in the rolled product wound up on the product winding reel 12, the circular both-surface adhesive pieces $22_0$ punched with the punching roll $R_2$ are pasted at regular intervals on the peeling sheet 21 and further the separator 31 for preventing the back surface from sticking is interposed between the both-surface adhesive pieces $22_0$ and peeling sheet 21.

However, in the case of this embodiment, accurately the separator is different from that in FIG. 1B and is provided below the peeling sheet but the effect of the separator itself is not difficult.

As mentioned above, the present invention has advantages that the product is much more convenient and practical than any conventional both-surface adhesive tape, that the producing apparatus is so simple in the structure that the cost is low, that the existing punching machine or pressing device can be utilized, that the both-surface adhesive tape having a both-surface adhesive of any shape and size can be automatically and continuously produced by only replacing the cutter or punching roll and that the utility of the tape itself and the industrial value of the apparatus are very high.

What is claimed is:

1. A both-surface adhesive tape producing apparatus comprising a means for unwinding a both-surface adhesive tape consisting of a bandshaped film and a band-shaped adhesive adhered on one side of said film, a means for supporting and guiding said both-surface adhesive tape pulled out of said unwinding means, a means for cutting a part of said adhesive to be of a fixed shape and size without cutting the still adhered film, feeding means for moving said both-surface tape to said cutting means, a peeling means for peeling the excess portion of said adhesive from the film while leaving the adhesive of fixed shape and size adhered to the film, means for winding up the excess portion of the adhesive and means for winding up said film with the adhered adhesive shape.

2. The both-surface adhesive tape producing apparatus according to claim 1 including means for applying a bandshaped separator on one side of said completed both-surface adhesive tape to sandwich the adhesive between the film and the separator.

3. The both-surface adhesive tape producing apparatus according to claim 2 including means for winding the tape with said band-shaped separator on a reel.

4. The both-surface adhesive tape producing apparatus according to claim 2 wherein said supporting and guiding means is a fixed receiving base and said cutting means reciprocates with respect to said receiving base.

5. The both-surface adhesive tape producing apparatus according to claim 1 wherein said supporting and guiding means is a fixed receiving base and said cutting means reciprocates with respect to said receiving base.

6. The both-surface adhesive tape producing apparatus according to claim 5 including an air cylinder and return springs for reciprocating the cutting means.

7. The both-surface adhesive tape producing apparatus according to claim 1 wherein said feeding means operates intermittently for moving said both-surface adhesive tape at fixed intervals and comprises tape unwinding and winding pinch rolls rotating only following said cutting operation, a both-surface adhesive tape unwindng reel rotated by said pinch rolls and a completed both-surface adhesive tape winding reel.

8. The both-surface adhesibe tape producing apparatus according to claim 7 including means for winding the tape with the band-shaped separator on a reel.

9. The both-surface adhesive tape producing apparatus according to claim 1 wherein said supporting and guiding means reciprocates with respect to the fixed cutting means.

10. The both-surface adhesive tape producing apparatus according to claim 1 wherein said feeding means is an intermittently feeding means for moving said both-surface adhesive tape at fixed intervals and comprises tape unwinding and winding pinch rolls intermittently rotated by a crank mechanism, said crank mechanism being operatively connected with said cutting means, said completed both-surface adhesive tape winding means being rotated by said winding pinch rolls.

11. The both-surface adhesive tape producing apparatus according to claim 1 wherein said completed both-surface adhesive tape winding means and excess both-surface adhesive winding means are slip-rotatable winding reels.

12. The both-surface adhesive tape producing apparatus according to claim 1 wherein said supporting and guiding means comprises a pressing roll and a receiving roll and said cutting means is a cutting roll cooperating with said receiving roll and provided with blades of a predetermined shape provided to project at fixed intervals on the peripheral surface.

13. The both-surface adhesive tape producing apparatus according to claim 1 wherein said feeding means comprises pressing rolls driven by a single driving source, a receiving roll for said cutting means, delivering rolls and a completed both-surface adhesive tape winding means.

14. The both-surface adhesive tape producing apparatus according to claim 1 wherein said peeling means comprises a pair of reels.

15. The both-surface adhesive tape producing apparatus according to claim 1 wherein said peeling means is a peeling plate provided substantially parallelly with the completed both-surface adhesive tape moving direction.

* * * * *